(12) United States Patent
Brouet et al.

(10) Patent No.: US 12,194,561 B2
(45) Date of Patent: Jan. 14, 2025

(54) ULTRASONIC VIBRATION SYSTEM COMPRISING A MECHANICAL RESONATOR

(71) Applicant: HERRMANN ULTRASCHALLTECHNIK GMBH & CO. KG, Karlsbad (DE)

(72) Inventors: Francois Brouet, Straubenhardt (DE); Stefan Zendler, Straubenhardt (DE); Volker Portje, Ittersbach (DE); Ulrich Vogler, Uhdingen-Mühlhofen (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 18/700,895

(22) PCT Filed: Oct. 6, 2022

(86) PCT No.: PCT/EP2022/077780
§ 371 (c)(1),
(2) Date: Apr. 12, 2024

(87) PCT Pub. No.: WO2023/061839
PCT Pub. Date: Apr. 20, 2023

(65) Prior Publication Data
US 2024/0416447 A1    Dec. 19, 2024

(30) Foreign Application Priority Data

Oct. 14, 2021   (DE) .......................... 102021126665.3

(51) Int. Cl.
*B23K 20/00*    (2006.01)
*B23K 20/10*    (2006.01)

(52) U.S. Cl.
CPC .................................. *B23K 20/106* (2013.01)

(58) Field of Classification Search
CPC ........ B23K 20/106; B23K 20/10; B06B 3/00; B06B 2201/72
See application file for complete search history.

(56) References Cited

U.S. PATENT DOCUMENTS 5,603,444 A *  2/1997  Sato ..................... B23K 20/106
                                                    228/1.1
11,897,047 B2 * 2/2024  Mancini ................. B23K 20/10
(Continued)

FOREIGN PATENT DOCUMENTS

DE    102004022509 A1    8/2005
DE    102018132840 A1    6/2020
EP       2881184 A1      6/2015

*Primary Examiner* — Erin B Saad
(74) *Attorney, Agent, or Firm* — Hudak, Shunk & Farine Co. LPA

(57) ABSTRACT

An ultrasonic oscillation system with a converter which can convert an electrical alternating voltage into a mechanical oscillation, and a sonotrode of mass $m_s$, which is intended to be set into oscillation with the mechanical oscillation, the converter being coupled to the sonotrode in such a way that the vibration generated by the converter generates a vibration excitation of the sonotrode, the ultrasonic vibration system being intended to be operated with a vibration of wavelength $\lambda$. In order to provide an ultrasonic oscillation system in which the problems described are at least reduced, the ultrasonic oscillation system has a mechanical resonator of mass $m_r$, which can be brought into resonant oscillation with an oscillation of wavelength $\lambda$, the mass $m_r$ of the resonator being larger than the mass $m_s$ of the sonotrode.

20 Claims, 2 Drawing Sheets

(56) References Cited

U.S. PATENT DOCUMENTS

| | | |
|---|---|---|
| 11,938,556 B2* | 3/2024 | Mancini ............... B23K 20/106 |
| 2004/0065415 A1* | 4/2004 | Sato ......................... B06B 3/00 |
| | | 156/580.1 |
| 2006/0169746 A1* | 8/2006 | Ozaki ..................... H01L 24/75 |
| | | 228/101 |
| 2007/0257087 A1 | 11/2007 | Klinstein et al. |
| 2010/0206487 A1* | 8/2010 | Arai ........................ B29C 65/08 |
| | | 228/1.1 |
| 2017/0274420 A1 | 9/2017 | Toda |
| 2019/0016279 A1* | 1/2019 | Lee ........................ B23K 20/10 |
| 2022/0040784 A1* | 2/2022 | Wenning .............. B23K 20/106 |
| 2022/0040785 A1* | 2/2022 | Mancini ................. G06Q 50/06 |
| 2022/0040786 A1* | 2/2022 | Mancini ............... B23K 20/106 |
| 2022/0072651 A1* | 3/2022 | Aust ..................... B23K 20/106 |
| 2022/0088700 A1* | 3/2022 | Mancini ............... B23K 20/106 |

* cited by examiner

ULTRASONIC VIBRATION SYSTEM COMPRISING A MECHANICAL RESONATOR

FIELD OF THE INVENTION

The present invention relates to an ultrasonic oscillation system comprising a converter which can convert an electrical alternating voltage into a mechanical oscillation, and a sonotrode of mass $m_s$ which is intended to be set into oscillation with the mechanical oscillation, the converter being coupled to the sonotrode in such a way that the oscillation generated by the converter generates an oscillation excitation of the sonotrode, wherein the ultrasonic oscillation system is intended to be operated with an oscillation of wavelength $\lambda$.

BACKGROUND OF THE INVENTION

Such ultrasonic oscillation systems are known. The sonotrode excited with the ultrasonic oscillation of the wavelength $\lambda$ is used to process materials by the sonotrode coming into contact with the materials to be processed and exciting them at their interfaces with an ultrasonic oscillation so that heat can be generated locally. As a rule, the material to be processed is positioned between the sonotrode and a counter tool, also known as an anvil.

For this purpose, the sonotrode has a so-called sealing surface, which is intended to come into contact with the material to be processed. The shape of the sonotrode is usually adapted in such a way that the sealing surface oscillates over its entire length and width with an oscillation amplitude that is as constant as possible in order to apply an ultrasonic oscillation to the material to be processed as evenly as possible over the entire sealing surface.

Whenever the sealing surface comes into contact with the material to be processed, a force is exerted more or less abruptly on the sonotrode, so that undesirable vibration modes, which result for example from the special shape of the sonotrode, are also excited. Unevenness in the material to be processed can also lead to the material exerting an uneven counterforce on the sonotrode along the sealing surface, so that, for example, a bending vibration is excited or the actually desired vibration mode is distorted. This is particularly pronounced in applications in which a rather hard material, such as metal, is processed with a sealing surface arranged on a lateral surface.

This waveform distortion can have a negative effect on the actually desired longitudinal oscillation, resulting in phase shifts and possibly uneven movements along the longitudinal direction. These undesirable vibrational movements are transferred to the converter and thus to the piezo ceramics generally arranged in the converter. However, these are not able to absorb such vibrations in the long term. As a result, the temperature of the piezo ceramics increases due to overstressing, which reduces the operating time.

It is therefore already common practice to limit the welding time or to take longer breaks between individual welding processes in order to give the piezo ceramics the opportunity to cool down again. In addition, more or less complicated cooling devices are provided to increase the welding time of the piezo ceramics. Nevertheless, defects can occur in the ceramic of the piezo elements, which reduces their service life. In the worst case, the piezo ceramic may break.

SUMMARY OF THE INVENTION

Based on the described state of the art, it is therefore the problem of the present invention to provide an ultrasonic oscillating system in which the problems described are at least reduced.

According to the invention, this problem is solved in that the ultrasonic oscillation system has a mechanical resonator of mass $m_r$, which can be brought into resonant oscillation with an oscillation with the wavelength $\lambda$, whereby the mass $m_r$ of the resonator is larger than the mass $m_s$ of the sonotrode.

A mechanical resonator is understood to be an oscillating system that is tuned to a frequency and possibly multiples thereof in such a way that the system essentially only oscillates at these frequencies, while excitations at other frequencies are greatly attenuated. Preferably, the resonator is designed as a vibrating body.

Because the mass $m_r$ of the mechanical resonator is relatively large, distortions of the desired oscillation form are considerably attenuated.

In a preferred embodiment, the mass $m_r$ of the resonator is at least 100%, preferably at least 150% and particularly preferably at least 200% larger than the mass $m_s$ of the sonotrode.

It is particularly preferable if the mechanical resonator is arranged between the converter and the sonotrode. Any unwanted vibrations that may be coupled into the system due to contact between the sonotrode on the one hand and the material to be processed on the other are therefore first transferred from the sonotrode to the mechanical resonator, which virtually completely cancels out these unwanted vibrations so that virtually no unwanted vibrations are transferred to the converter and the piezo elements it contains. However, the coupling of the mechanical resonator to the oscillation system alone ensures that the oscillation shape of the entire oscillation system remains closer to the desired oscillation shape.

In many cases, an amplitude transformer of mass $m_a$ is used between the converter and the sonotrode, which changes the amplitude of the ultrasonic oscillation—but not the frequency—of the oscillation. This allows the amplitude of an oscillation generated by the converter to be scaled (usually increased but also reduced) before the oscillation is coupled into the sonotrode.

If such an amplitude transformer is used, the mechanical resonator can be arranged either between the amplitude transformer and the sonotrode or between the amplitude transformer and the converter, with the latter being particularly preferred. Unwanted oscillation modes can also be coupled into the system via the amplitude transformer, so that the arrangement of the mechanical resonator between the amplitude transformer and converter also filters these accordingly.

The transformation properties of the amplitude transformer usually also ensure that the vibration amplitude of the unwanted vibrations coupled into the system via the sonotrode is only passed on to the mechanical resonator at a reduced level.

In a further preferred embodiment, the mass $m_r$ of the resonator is larger than the sum of the mass $m_s$ of the sonotrode and the mass $m_a$ of the amplitude transformer.

Due to the comparatively large mass of the mechanical resonator, unwanted vibration components are filtered or attenuated to a larger extent.

However, it is also possible to design the amplitude transformer as a mechanical resonator in the sense of the present invention. In such a case, no additional component is necessary. Instead, the mass of the amplitude transformer is increased. However, since it is not unusual for a mounting to be provided on the amplitude transformer, the corresponding mounting holder must then also be modified due to the larger dimensions of the amplitude transformer, which may not be possible in all applications for reasons of space.

In a preferred embodiment, the mechanical resonator has a length of $\lambda/2$ or a multiple thereof. In these cases, the mechanical resonator can effectively be made to resonate with the wavelength $\lambda$.

In a further preferred embodiment, the mechanical resonator has a length l and can be made to resonate with a longitudinal oscillation with the wavelength A oriented along the length l. In a preferred embodiment, the mechanical resonator has a constant cross-section along at least 80% of its length l, and particularly preferably the mechanical resonator has a constant cross-section along at least 95% of its length. Preferably, the mechanical resonator has a constant cross-section along its entire length.

Alternatively, the mechanical resonator can also have two sections with different cross-sections, each of which has a constant cross-section along at least 25% of the length l. In this case, the mechanical resonator not only filters or attenuates distortion components of the desired oscillation shape, but also provides an amplitude transformation. This mechanical resonator can be used in addition to an existing amplitude transformer or replace it completely.

These shapes ensure that other vibration modes are very effectively attenuated or filtered out.

In a further preferred embodiment, the mechanical resonator has a cross-sectional area that is rotationally symmetrical, with the cross-sectional area preferably being circular. For example, the mechanical resonator can have the shape of a cylinder.

In a further particularly preferred embodiment, the mechanical resonator has an average cross-sectional area Q and a length l, where $Q>0.5l^2$ preferably $Q>l^2$ and most preferably $Q>1.5l^2$. It has been shown that the large average cross-sectional area (in a sectional view perpendicular to the length l) can filter out unwanted vibration very effectively.

Significantly larger cross-sectional areas have no additional effect, so that in another preferred embodiment $Q<5l^2$ preferably $Q<3l^2$ and best $Q<2l^2$ is.

In another preferred embodiment, the converter is designed as the mechanical resonator. The large mass $m_r$ is therefore provided by the converter, so that an additional component can also be dispensed with in this case.

Such an ultrasonic oscillating system is particularly preferred for welding metal.

BRIEF DESCRIPTION OF THE DRAWINGS

Further advantages, features and possible applications of the present invention will become apparent from the following description of a preferred embodiment and the associated figures. It shows.

DETAILED DESCRIPTION OF THE INVENTION

Figure 1:
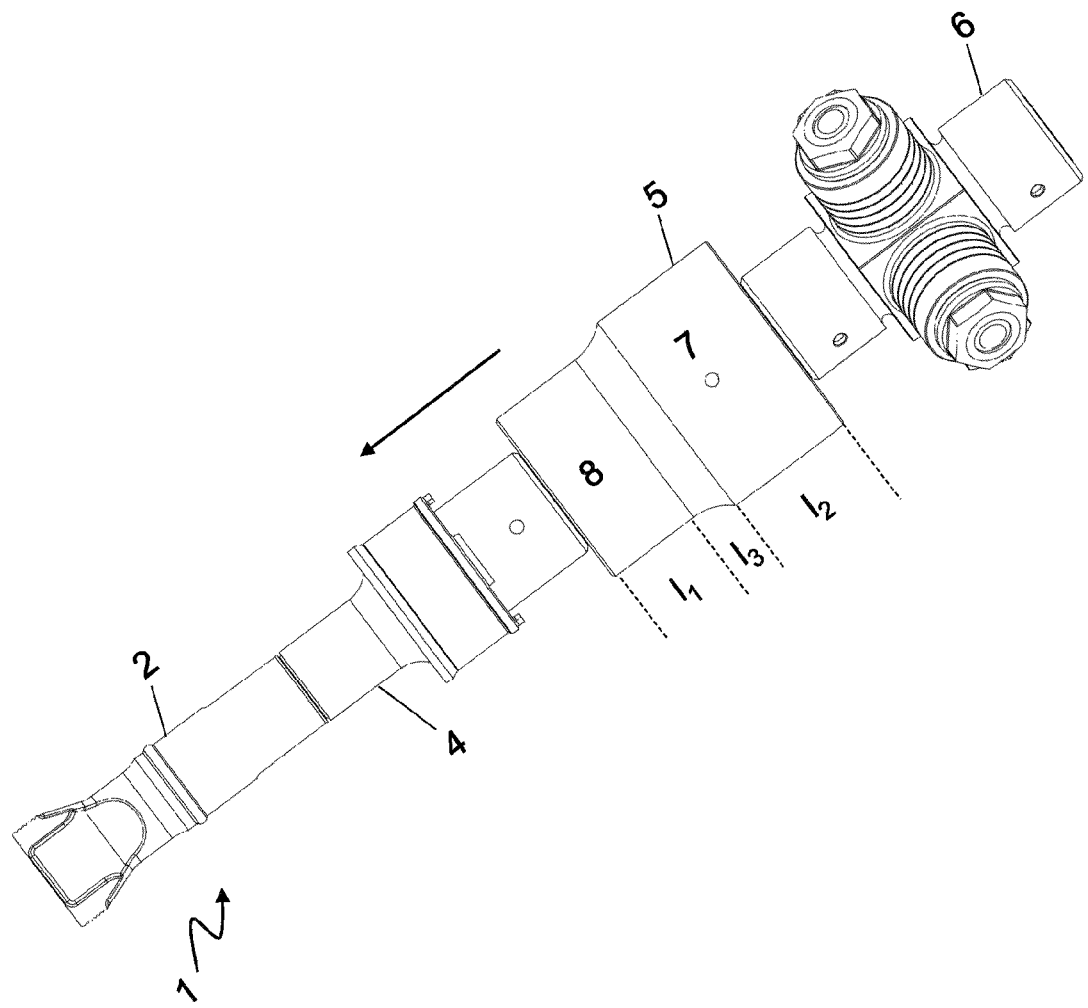
FIG. 1 is a side view of one embodiment of the invention.
Figure 2:
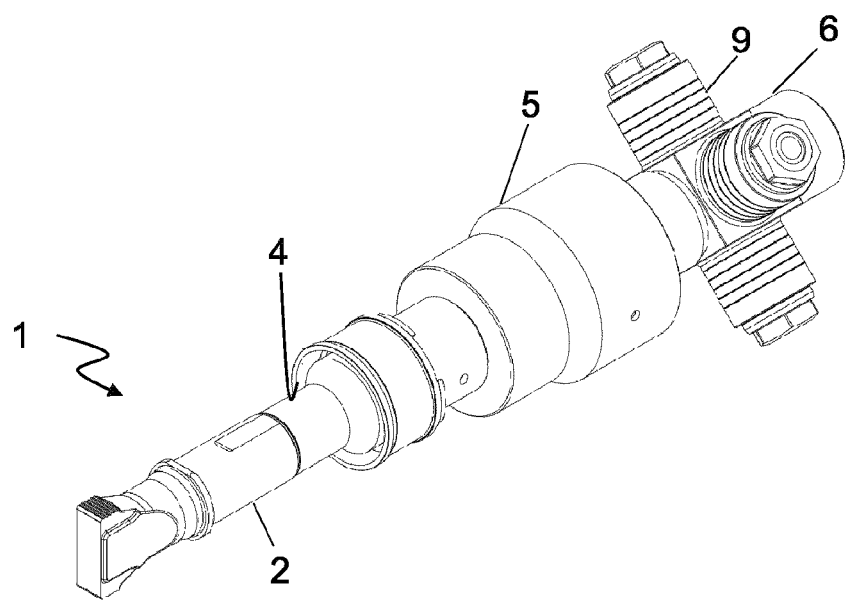
FIG. 2 is a perspective view of the embodiment of the invention shown in FIG. 1.

FIG. 1 shows an embodiment of the invention. The ultrasonic oscillating system 1 has a sonotrode 2 which has a first and a second end face, the end faces being arranged opposite one another, and a circumferential lateral surface connecting the two end faces.

Furthermore, a converter 6 is provided, which has a plurality, namely 4, of piezo crystal stacks 9, which are all oriented perpendicular to the longitudinal direction of the ultrasonic vibration unit 1. These piezo crystal stacks 9 convert an electrical alternating voltage into a mechanical vibration. Due to the star-shaped arrangement of the four piezo crystal stacks 9, a longitudinal ultrasonic oscillation is excited in the ultrasonic oscillation system 1 in the longitudinal direction, which is marked by an arrow in FIG. 1.

An amplitude transformer 4 is arranged on the first end face of the sonotrode 2, which increases the vibration amplitude of the vibration coupled into the system from the right in FIG. 1 and transmits it to the sonotrode 2.

The sonotrode 2 is designed to weld a material, namely a metal strand in the example shown. For this purpose, the sonotrode 2 has a sealing surface arranged on the lateral surface, which can come into contact with the metal strand. The sealing surface is arranged on a section of the lateral surface facing the second end face.

A mechanical resonator 5 is arranged between the amplitude transformer 4 and the converter 6, which in this case consists of a cylindrical element. The length l of the mechanical resonator 5 corresponds to half the wavelength $\lambda$ of the excitation oscillation generated by the converter 6. The oscillation of wavelength $\lambda$ generated by the converter 6 is transmitted by the mechanical resonator 5 to the amplitude transformer 4, which transforms the amplitude or, in this case, increases it and transmits it to the sonotrode 2. The mechanical resonator 5 has two sections 7, 8, each of which has a constant diameter, although the diameter of section 7, which is located closer to the converter 6, is larger than the diameter of section 8, which is located closer to the amplitude transformer 4. Section 8 has a length of $l_1$ and section 7 has a length of $l_2$. A transition section, which has a length of $l_3$, is arranged between sections 7 and 8. The length of the mechanical resonator 5 is thus made up of the lengths $l_1$, $l_2$ and $l_3$ ($l=l_1+l_2+l_3$). This embodiment has the advantage that the mechanical resonator 5 also performs an amplitude transformation.

Due to the contact of the sonotrode 2 with the metal strand 3, further oscillation modes or distortions of the oscillation form are excited, which in turn are transmitted from the sonotrode 2 to the amplitude transformer 4. Since the mechanical resonator 5 of length l is arranged between the amplitude transformer 4 and the converter 6, these vibration modes are practically completely filtered by the mechanical resonator 5 or the distortions are significantly attenuated, so that these vibrations are not transmitted to the converter 6 or the piezo elements in the converter 6.

The arrangement of a mechanical resonator 5 in the ultrasonic oscillating system 1 according to the invention effectively filters out interfering vibrations that affect the piezo crystals, thus significantly extending the service life of the piezo elements.

REFERENCE SIGNS

1 Ultrasonic oscillating system
2 Sonotrode
4 Amplitude transformer
5, resonator
6 Converter
7,8 Resonator sections
9 Piezo crystal stack

What is claimed is:

1. An ultrasonic oscillating system, comprising:
a converter which can convert an electrical alternating voltage into a mechanical oscillation, and a sonotrode of mass $m_s$ which is intended to be set into oscillation with the mechanical oscillation, the converter being coupled to the sonotrode in such a way that the oscillation generated by the converter generates an oscillation excitation of the sonotrode,
wherein the ultrasonic oscillating system is intended to be operated with an oscillation of wavelength $\lambda$,
wherein the ultrasonic oscillating system has a mechanical resonator of mass $m_r$ which can be brought into resonant oscillation with an oscillation of wavelength $\lambda$, the mass $m_r$ of the resonator being larger than the mass $m_s$ of the sonotrode.

2. The ultrasonic oscillating system according to claim 1, wherein the mass $m_r$ of the resonator is larger than the mass $m_s$ of the sonotrode by at least 100%.

3. The ultrasonic oscillating system according to claim 1, wherein the mechanical resonator is arranged between the converter and the sonotrode.

4. The ultrasonic oscillating system according to claim 1, wherein an amplitude transformer of mass $m_a$ is arranged between the converter and the sonotrode.

5. The ultrasonic oscillating system according to claim 4, wherein the mass $m_r$ of the resonator is larger than the sum of the mass $m_s$ of the sonotrode and the mass $m_a$ of the amplitude transformer.

6. The ultrasonic oscillating system according to claim 4, wherein the amplitude transformer is designed as the mechanical resonator.

7. The ultrasonic oscillating system according to claim 1, wherein the mechanical resonator has a length l of n $\lambda/2$, where n is a natural number.

8. The ultrasonic oscillating system according to claim 1, wherein the mechanical resonator has a length l and can be brought into resonant oscillation with a longitudinal oscillation oriented along the length l and having the wavelength $\lambda$, the mechanical resonator having a constant cross-section along at least 80% of its length, or the mechanical resonator having two sections with different cross-sections, each of which has a constant cross-section along at least 35% of the length l.

9. The ultrasonic oscillating system according to claim 1, wherein the mechanical resonator has a cross-sectional area which is rotationally symmetrical.

10. The ultrasonic oscillating system according to claim 9, wherein the mechanical resonator has the shape of a cylinder.

11. The ultrasonic oscillating system according to claim 1, wherein the mechanical resonator has an average cross-sectional area Q and a length l, where $Q>0.5l^2$.

12. The ultrasonic oscillating system according to claim 11, wherein $Q<5l^2$.

13. The ultrasonic oscillating system according to claim 1, wherein the converter is designed as the mechanical resonator.

14. A use of an ultrasonic oscillating system according to claim 1 for welding metal.

15. The ultrasonic oscillating system according to claim 2, wherein the mechanical resonator is arranged between the converter and the sonotrode.

16. The ultrasonic oscillating system according to claim 15, wherein an amplitude transformer of mass $m_a$ is arranged between the converter and the sonotrode, and wherein the mass $m_r$ of the resonator is larger than the sum of the mass $m_s$ of the sonotrode and the mass $m_a$ of the amplitude transformer.

17. The ultrasonic oscillating system according to claim 16, wherein the amplitude transformer is designed as the mechanical resonator, and wherein the mechanical resonator has a length l of n $\lambda/2$, where n is a natural number.

18. The ultrasonic oscillating system according to claim 17, wherein the mechanical resonator has a length l and can be brought into resonant oscillation with a longitudinal oscillation oriented along the length l and having the wavelength $\lambda$, the mechanical resonator having a constant cross-section along at least 80% of its length, or the mechanical resonator having two sections with different cross-sections, each of which has a constant cross-section along at least 35% of the length l, and wherein the mechanical resonator has a cross-sectional area which is rotationally symmetrical.

19. The ultrasonic oscillating system according to claim 9, wherein the mechanical resonator has the shape of a cylinder, and wherein the mechanical resonator has an average cross-sectional area Q and a length l, where $Q>0.5l^2$.

20. The ultrasonic oscillating system according to claim 19, wherein $Q<5l^2$, and wherein the converter is designed as the mechanical resonator.

* * * * *